April 26, 1938.   G. A. McCLAIN   2,115,114
CASTER WHEEL
Filed Nov. 14, 1936    2 Sheets-Sheet 1
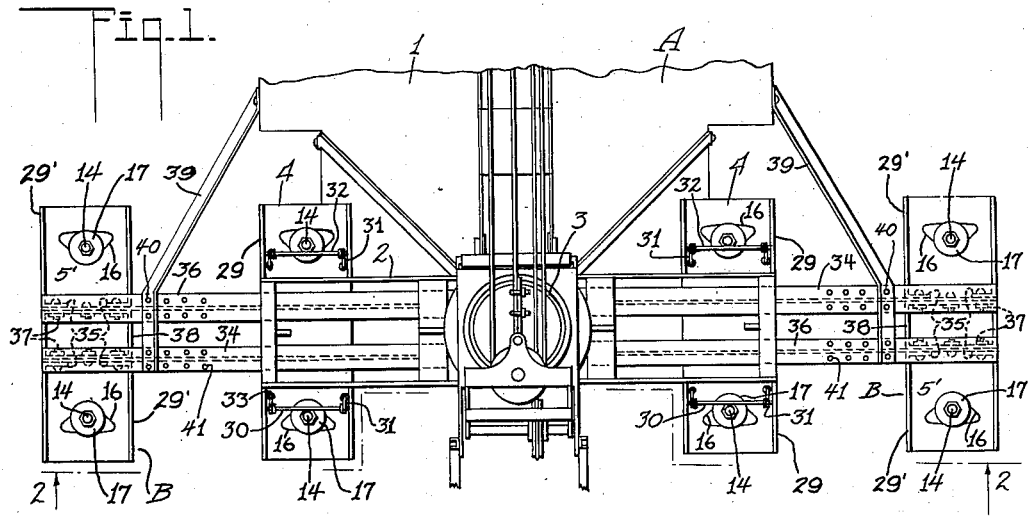
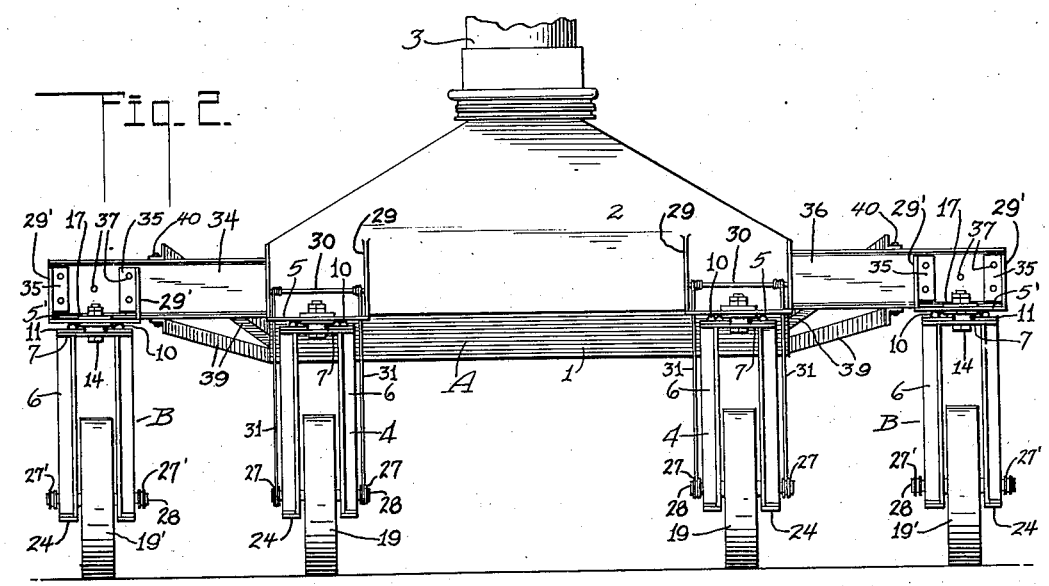
INVENTOR.
GROVER A. McCLAIN
BY Munn, Anderson & Liddy
ATTORNEY April 26, 1938.  G. A. McCLAIN  2,115,114
CASTER WHEEL
Filed Nov. 14, 1936  2 Sheets-Sheet 2
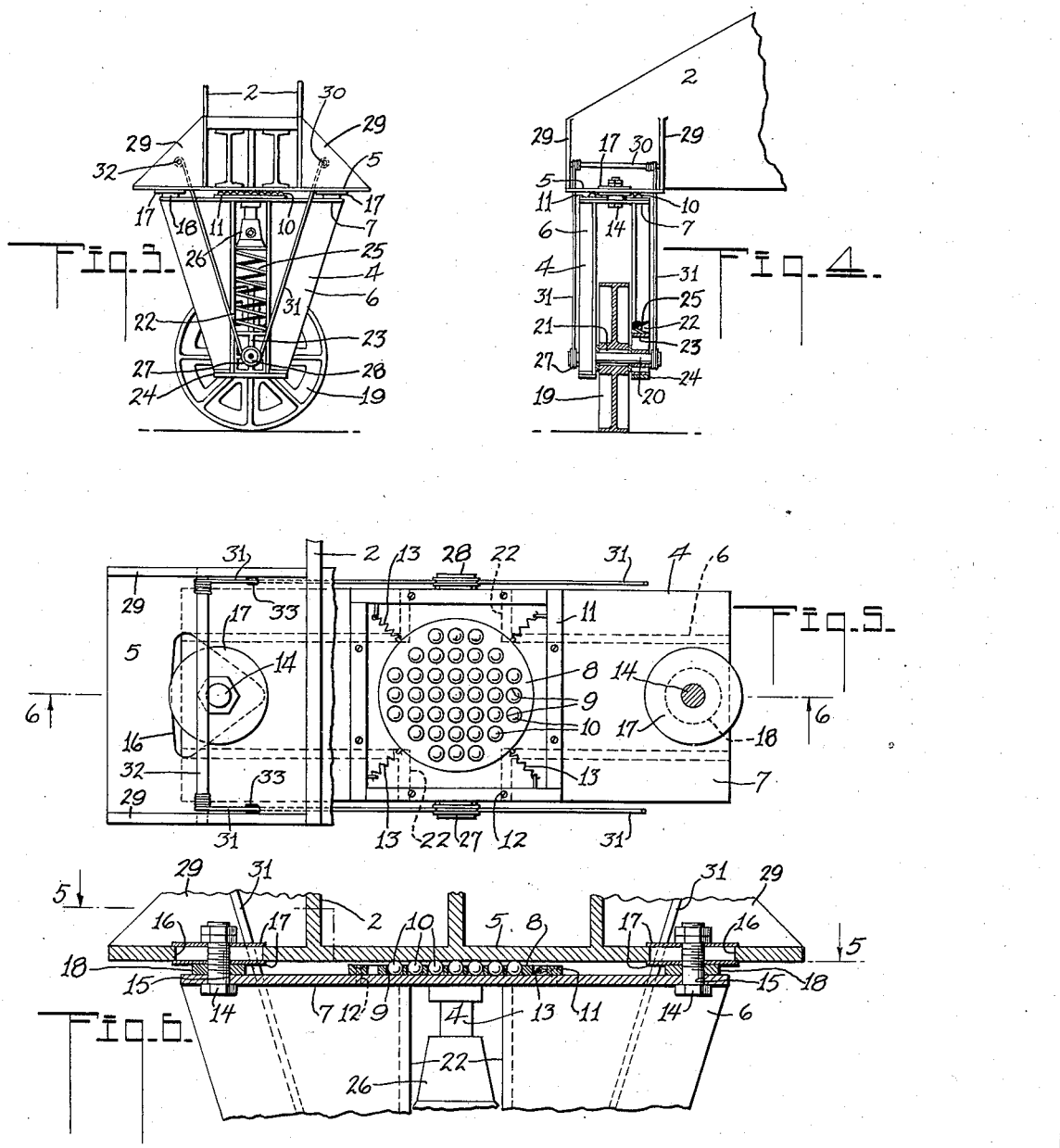
INVENTOR.
GROVER A. McCLAIN
BY Munn, Anderson & Liddy
ATTORNEY Patented Apr. 26, 1938

2,115,114

UNITED STATES PATENT OFFICE 2,115,114

CASTER WHEEL

Grover A. McClain, San Francisco, Calif.

Application November 14, 1936, Serial No. 110,905

17 Claims. (Cl. 16—21)

My invention relates to improvements in caster wheels, and it consists of the combinations, constructions and arrangements hereinafter described and claimed.

An object of my invention is to provide an improvement over a caster wheel shown in my co-pending application for a portable crane, Serial No. 22,273, filed May 18, 1935, which has become Patent No. 2,082,017, dated June 1, 1937. In the co-pending application the caster wheel is used for supporting a crane during the time the crane is carrying a load. In the present invention I show two caster wheels disposed adjacent to the sides of the vehicle and supporting a mast base for the crane. These caster wheels may be raised into inoperative position when the crane is not supporting a load, and when the vehicle carrying the crane is being moved along a highway or the like. The vehicle preferably is a standard truck that is movable under its own power and strong enough to support the unloaded crane.

When the crane is being used for supporting a load it is possible to make use of jacks for compressing springs associated with the caster wheels, and in this way the caster wheels will aid the vehicle in supporting the loaded crane even though the caster wheels may drop into slight depressions in the roadway during the movement of the vehicle. The jacks may be removed when not needed, and this will permit the caster wheel springs to function in the ordinary manner.

Where it is necessary to swing the loaded crane to the side of the vehicle I provide auxiliary caster wheels secured to outriggers, and these outriggers in turn aid in supporting the mast. The mast is provided with permanent outriggers, and these may be attached to the auxiliary caster wheels when necessary. I also make use of auxiliary outriggers which cooperate with the permanent ones, and connect the auxiliary caster wheels to the mast base. I further provide means for adjustably securing the permanent and auxiliary outriggers in the desired position, and in this way the auxiliary caster wheels may be spaced at desired distances from the sides of the vehicle.

The caster wheel itself is supported in a novel manner so that either end of the guide frame for the caster wheel may swing laterally to permit the caster wheel to rotate into the desired angular position. I have found that a standard caster wheel rotating about a vertical axis will not support a loaded crane, and at the same time freely turn into the desired angular position. My co-pending application illustrates the type of caster wheel that is claimed in the present case.

Other objects and advantages will appear in the following specification, and the novel features of the device will be particularly pointed out in the appended claims.

My invention is illustrated in the accompanying drawings forming a part of this application, in which Figure 1 is a top plan view of a portable crane showing the permanent and auxiliary caster wheels operatively applied thereto;

Figure 2 is a section substantially along the line 2—2 of Figure 1;

Figure 3 is an end elevation of the mast base and one of the caster wheels;

Figure 4 is a front elevation of Figure 3, the caster wheel and a portion of the associate mounting being shown in section;

Figure 5 is a section substantially along the line 5—5 of Figure 6; and

Figure 6 is a section along the line 6—6 of Figure 5.

In carrying out my invention I make use of a vehicle such as a truck indicated generally at A. The truck has a body 1 that carries a mast base indicated at 2. The mast base supports a crane indicated generally at 3.

At the sides of the mast base I mount permanent caster wheels indicated at 4. I show two caster wheels mounted at the ends of the base 2, and since each caster wheel is identical a description of one will suffice. The caster wheel is shown in detail in Figures 3 to 6 inclusive.

The mast base 2 has a plate 5 acting as a bearing surface for a caster wheel guide frame 6. Figure 6 shows the top of the guide frame provided with a plate 7 that also acts as a bearing surface. Between the plates 5 and 7 I mount a ball carriage 8 that is in the form of a disc, and is provided with a plurality of openings 9 for receiving ball bearings 10. A frame 11 surrounds the ball carriage 8 and is secured to the plate 7 by screws 12 or other suitable fastening means. Springs 13 are connected to the ball carriage 8 and to the frame 11 for centering the ball carriage 8 in the frame. Figure 6 shows the balls 10 supporting the weight of the mast base 2 and acting as a connection between the plates 5 and 7. The ball bearings 10 permit limited movement of the plate 7 with respect to the plate 5.

The means for controlling this movement consists of bolts 14 passed through openings 15 in the plate 7 and through triangularly shaped openings 16 in the plate 5, see Figure 5. The plate washers 17 are also mounted on the bolts 14 and have a diameter slightly greater than the greatest width of the openings 16. I provide two plate washers for each bolt, and these slide on opposite sides of the plate 5. Beneath the lowermost plate washer 17 and the plate 7 I mount spacers 18. It will be seen from this construction that the bolts 14 permit movement of the plate 7 with respect to the plate 5 to the extent limited by the triangular openings 16.

Reference to Figure 1 shows the triangular openings 16 in the plate 5 positioned so that their apexes point toward each other and their bases extend away from each other. It will be noted from Figure 1 and also Figure 5 that the bases are arcuate in shape, the center of the radius describing the arc lying at the center of the curve forming the apex in the opposite triangular opening. The curved apex of each triangular slot has a radius equal to that of the bolt 14. When, therefore, movement takes place between the plates 5 and 7 sufficient to position the right-hand bolt 14 in Figure 6 at the apex of the right-hand opening 16, then the left-hand bolt 14 will be disposed adjacent to the arcuate base of the left-hand opening 16. Any lateral movement of the plate 5 with respect to the plate 7 will now permit the left-hand bolt 14 to swing laterally in the left-hand opening 16. This will permit the plate 7 to pivot about the right-hand bolt 14 and allow a wheel 19 to act as a caster wheel. It is obvious that the movement of the left-hand bolt 14 to the apex of the triangular opening 16 caused by relative movement between the plates 5 and 7 will permit the opposite end of the plate 7 to swing laterally. The ball bearings 10 in the carriage 8 permit this movement and the springs 13 allow the ball carriage to move within the frame 11.

It is best now to describe the mounting for the caster wheel 19. Figures 3 and 4 show the caster wheel mounted on a shaft 20 and roller bearings 21 are placed between the hub of the wheel and the shaft. The guide frame 6 consists of two pairs of depending members, the pairs being spaced apart for receiving the wheel 19 and the members in each pair being spaced apart for providing a guide 22. A shaft housing 23 is slidably mounted in each guide and rotatably carries the shaft 20. The bottom of each guide 22 is closed by a cover plate 24. A spring 25 bears against the top of the shaft housing 23 and its upper end normally bears against the plate 7. However, where it is desired to increase the compression of the spring 25 in order to move the caster wheel 19 into any road depressions, a jack 26 may be interposed between the plate 7 and the top of the spring 25. This jack may be extended in length in the usual manner for compressing the spring 25 to the desired extent.

The shaft 20 carries a sheave 27 at each end and each sheave is held in place by a shaft cap 28. Figures 3, 4 and 5 show the mast base 2 provided with reinforcing triangularly shaped members 29 that extend from the ends of the plate 5 to the mast base 2. A pipe 30 extends through aligned openings in one pair of the members 29 and cables 31 are dead-ended at this pipe and then are passed around the sheaves 27. The free ends of the cables then are wrapped around a second pipe 32 carried by the other pair of reinforcing members 29. Any means not shown may be used for rotating the pipe 32 for shortening the cables 31 and thereby lifting the sheaves 27 and carrying upwardly therewith the caster wheel 19. The pipe 32 may be locked after rotation, and thus support the caster wheel 19 in raised position. Prior to raising the caster wheel the jack 26 and the spring 25 may be removed from each guide 22. One type of mechanism for raising the caster wheel is shown in my co-opending application.

It should be noted in Figures 3 and 4 that the cables 31 extend along the outer sides of the guide frames 6 and then pass through slots 33 in the plate 5 so that they will be positioned between the members of each pair of braces 29.

In Figures 1 and 2 I show permanent outriggers 34. These outriggers are slidable within the mast base 2 and are for the purpose of counter-balancing the mast base when the crane is rotated into a position where the load will be supported at the side of the vehicle. Where this load reaches a weight that will tend to upset the vehicle I provide auxiliary caster wheels indicated at B. These caster wheels and their associate parts are identical to the caster wheel already described. The plates 5' of the auxiliary caster wheels carry reinforcing braces 29', and Figure 1 shows the inner ends of these braces being curved inwardly at 35 for bearing against the permanent outrigger 34 and an extra outrigger 36. Bolts 37 or other suitable fastening means secures the portions 35 to the two outriggers. The outriggers 34 and 36 are spaced apart by a box filler 38 and the same bolts 37 secure the filler to the auxiliary caster wheels B.

The outriggers 34 and 36 may be extended to the desired position, and then secured in extended position by braces 39 that extend from the truck body 1 to the tops and bottoms of the outriggers. Bolts 40 or other suitable fastening means are used for securing the braces 39 to the outriggers. The outriggers are provided with additional openings 41 for receiving the bolts 40 and in this way the outriggers may be extended to the desired position, and then secured against longitudinal movement.

The auxiliary caster wheels B cooperate with the caster wheels 4 in supporting the loaded crane and in preventing the lateral tilting of the vehicle body. The caster wheels may be used in supporting the loaded crane while the vehicle is moved over the ground. Any turning of the vehicle during this movement will cause the caster wheels to swing in the manner already indicated, and thus permit the vehicle to be readily steered during its movement. I have shown the auxiliary caster wheels 19' provided with sheaves 27', although these may not be needed inasmuch as the entire auxiliary caster wheel assembly preferably is disconnected from the outriggers 34 and 36 when the auxiliary caster wheels are not needed. The bolts 37 permit the auxiliary caster wheels to be removed. The extra outriggers 36 also are removed, and this leaves the mast base with just the permanent outriggers 34.

While I have shown only the preferred form of my invention, it should be understood that various changes or modifications may be made within the scope of the appended claims without departing from the spirit of the invention.

I claim:

1. A caster wheel construction comprising a stationary plate having triangularly shaped recesses therein, a movable plate, a ball race disposed between said plates, means connecting the plates together and being received in the recesses, and a wheel carried by the movable plate.

2. A caster wheel construction comprising a stationary plate having triangularly shaped recesses therein, a movable plate, a ball race disposed between said plates, means connecting the plates together and being received in the recesses, a wheel carried by the movable plate, vertical guides for the wheel, spring means for urging the wheel into engagement with the ground, and means for lifting and for supporting the wheel above the ground.

3. A caster wheel construction comprising a fixed plate having two triangularly shaped recesses therein, a movable plate disposed beneath the fixed plate, a ball race disposed between the plates, yielding means for returning the ball race to a central position after each movement, means connecting the plates together and being received in the recesses, and a wheel carried by the movable plate.

4. A caster wheel mounting comprising a bearing surface, a frame carrying a second bearing surface disposed beneath the first surface, frictionless means disposed between the two surfaces, a wheel rotatably carried by the frame, and means connecting each end of the second bearing surface with the first bearing surface, said means having a limited lateral movement with respect to the first bearing surface, whereby either end of the second bearing surface may swing laterally with respect to the first bearing surface.

5. A caster wheel mounting comprising a bearing surface, a second bearing surface disposed beneath the first surface and carrying a wheel, a pair of connections between the surfaces, said first surface having guides for receiving the connections and for limiting the longitudinal and transverse movements of the second surface with respect to the first surface.

6. A caster wheel mounting comprising a bearing surface, a second bearing surface disposed beneath the first surface and carrying a wheel, connections between the surfaces, said first surface having V-shaped guides for limiting the longitudinal and transverse movements of the second surface with respect to the first surface.

7. A caster wheel mounting comprising a bearing surface, a second bearing surface disposed beneath the first surface and carrying a wheel, connections between the two surfaces, said connections being disposed equal distances from a vertical line extending through the center of the wheel axis, guides carried by the first surface and slidably receiving the connections, said guides permitting a limited longitudinal movement of the first surface with respect to the second and a lateral swinging of the rear end of the second surface with respect to the first surface after such movement.

8. A caster wheel mounting comprising a bearing surface, a frame carrying a wheel and having a second bearing surface, means connecting the two surfaces together at two separated points and with a limited movement between the surfaces, and a ball bearing carrier disposed between the surfaces and being movable within predetermined limits for permitting relative movement between the surfaces.

9. A caster wheel mounting comprising a bearing surface, a frame carrying a wheel and having a second bearing surface, means connecting the two surfaces together at two separated points and with a limited movement between the surfaces, and a ball bearing carrier disposed between the surfaces and being movable within predetermined limits for permitting relative movement between the surfaces, and guide means in the first surface and co-operating with said connecting means for limiting the longitudinal movement between the two surfaces and the lateral movement of the rear end of the second surface with respect to the first surface.

10. In combination, a bearing surface with two triangular openings therein, the apexes of the openings facing each other, a frame provided with a second bearing surface, a ball bearing carrier mounted on the second surface, yielding means for returning the carrier to a predetermined position, ball bearings disposed in the carrier and acting as a frictionless support between the two surfaces, a wheel carried by the frame, and connections between the surfaces, said connections being slidably received in the openings and permitting longitudinal movement between the two surfaces and a transverse movement of the rear end of the second surface with respect to the first.

11. In combination, a bearing surface with two triangular openings therein, the apexes of the openings facing each other, a frame provided with a second bearing surface, a ball bearing carrier mounted on the second surface, yielding means for returning the carrier to a predetermined position, ball bearings disposed in the carrier and acting as a frictionless support between the two surfaces, a wheel carried by the frame, and connections between the surfaces, said connections being slidably received in the openings and permitting longitudinal movement between the two surfaces and a transverse movement of the rear end of the second surface with respect to the first, said connections consisting of bolts and discs mounted on the bolts of a diameter slightly larger than the openings.

12. In combination, a bearing surface, a frame having a bearing surface disposed beneath the first surface, spaced connections between the surfaces for permitting a limited longitudinal and transverse movement therebetween, a wheel carried by the frame and normally contacting with the ground, and means associated with the first surface for lifting the wheel above the ground.

13. A caster wheel construction comprising a stationary plate having triangularly shaped recesses therein, a movable plate, a ball race disposed between said plates, means connecting the plates together and being received in the recesses, and a wheel carried by the movable plate, guides for the wheel, and a spring means for urging the wheel into engagement with the ground.

14. A caster wheel construction comprising a fixed plate having two triangularly shaped recesses therein, a movable plate disposed beneath the fixed plate, a ball race disposed between the plates, yielding means for returning the ball race to a central position after each movement, means connecting the plates together and being received in the recesses, and a wheel carried by the movable plate, guides for the wheel, and spring means for urging the wheel into engagement with the ground.

15. A caster wheel mounting comprising a bearing surface, a second bearing surface disposed beneath the first surface and carrying a wheel, a pair of spaced connections between the two surfaces, guides carried by the first surface and slidably receiving the connections, said guides permitting a limited longitudinal movement of the first surface with respect to the second and a lateral swinging of the rear end of the second surface with respect to the first surface after such movement.

16. In combination, a bearing surface with two triangular openings therein, the apexes of the openings facing each other, a frame provided with a second bearing surface, frictionless means disposed between the surfaces, a wheel carried by the frame, and connections between the surfaces, said connections being slidably received in the openings and permitting longitudinal movement between the two surfaces and a transverse movement of the rear end of the second surface with respect to the first.

17. In combination, a bearing surface with two triangular openings therein, the apexes of the openings facing each other, a frame provided with a second bearing surface, frictionless means disposed between the surfaces, a wheel carried by the frame, said connections consisting of bolts, and discs mounted on the bolts of a diameter slightly larger than the openings.

GROVER A. McCLAIN.